(12) United States Patent
Fukumine

(10) Patent No.: US 11,512,187 B2
(45) Date of Patent: Nov. 29, 2022

(54) RUBBER COMPOSITION AND RUBBER CROSSLINKED PRODUCT

(71) Applicant: ZEON CORPORATION, Tokyo (JP)

(72) Inventor: Yoshio Fukumine, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 147 days.

(21) Appl. No.: 16/771,346

(22) PCT Filed: Dec. 5, 2018

(86) PCT No.: PCT/JP2018/044681
§ 371 (c)(1),
(2) Date: Jun. 10, 2020

(87) PCT Pub. No.: WO2019/131019
PCT Pub. Date: Jul. 4, 2019

(65) Prior Publication Data
US 2020/0347208 A1    Nov. 5, 2020

(30) Foreign Application Priority Data

Dec. 26, 2017 (JP) .............................. JP2017-250161

(51) Int. Cl.
| | |
|---|---|
| *C08L 13/00* | (2006.01) |
| *C08J 7/14* | (2006.01) |
| *C08K 3/04* | (2006.01) |
| *C08K 3/22* | (2006.01) |
| *C08K 3/34* | (2006.01) |
| *C08K 5/00* | (2006.01) |
| *C08K 9/04* | (2006.01) |
| *C08L 71/00* | (2006.01) |

(52) U.S. Cl.
CPC ................. *C08L 13/00* (2013.01); *C08J 7/14* (2013.01); *C08K 3/04* (2013.01); *C08K 3/22* (2013.01); *C08K 3/34* (2013.01); *C08K 5/0016* (2013.01); *C08K 9/04* (2013.01); *C08L 71/00* (2013.01); *C08K 2003/222* (2013.01); *C08K 2003/2227* (2013.01); *C08K 2201/006* (2013.01); *C08L 2201/08* (2013.01); *C08L 2203/18* (2013.01); *C08L 2312/00* (2013.01)

(58) Field of Classification Search
CPC ................................. C08L 13/00; C08K 3/22
See application file for complete search history.

(56) References Cited

U.S. PATENT DOCUMENTS

| | | |
|---|---|---|
| 2017/0166672 A1 | 6/2017 | Inoue et al. |
| 2017/0204244 A1 | 7/2017 | Katada |
| 2018/0251628 A1 | 9/2018 | Sugawara |
| 2018/0327517 A1 | 11/2018 | Mosaki |

FOREIGN PATENT DOCUMENTS

| | | |
|---|---|---|
| CN | 106661280 A | 5/2017 |
| EP | 3 305 818 A1 | 4/2018 |
| EP | 3378891 A1 | 9/2018 |
| JP | 2016-006132 A | 1/2016 |
| JP | 2017-008161 A | 1/2017 |
| WO | 2017/047571 A1 | 3/2017 |
| WO | 2017/086358 A1 | 5/2017 |

OTHER PUBLICATIONS

Nov. 30, 2021 Office Action issued in Chinese Patent Application No. 201880081137.0.
Oct. 21, 2021 Office Action issued in Indian Patent Application No. 202017024907.
Feb. 12, 2019 Search Report issued in International Patent Application No. PCT/JP2018/044681.
Jun. 23, 2021 Extended Search Report issued in European Patent Application No. 18895956.3.
Jun. 7, 2022 Office Action issued in Japanese Patent Application No. 2019-562911.

*Primary Examiner* — Wenwen Cai
(74) *Attorney, Agent, or Firm* — Oliff PLC

(57) ABSTRACT

A rubber composition includes a carboxyl group-containing nitrile rubber of which iodine value is 120 or less, a polyetherester plasticizer, and a metallic compound, wherein an amount of stearic acid adsorbed by the metallic compound is 80 mg/g or more and 300 mg/g or less.

4 Claims, No Drawings

RUBBER COMPOSITION AND RUBBER CROSSLINKED PRODUCT

TECHNICAL FIELD

The present invention is a rubber composition and a rubber crosslinked product.

BACKGROUND ART

Nitrile rubber, i.e., a copolymer of butadiene and acrylonitrile, is widely used in various sealing materials, hoses, and the like, mainly for automotive applications as a rubber material that provides a rubber crosslinked product with excellent heat resistance, oil resistance, and sealing performance. In particular, automotive sealing materials that come into contact with fuel oil, engine oil, and the like come into contact with water and the like contained in the engine oil and are likely to deteriorate due to the influence of heat and the like. Therefore, among the nitrile rubbers, a carboxyl group-containing nitrile rubber having excellent sealing performance, mechanical characteristics, and water resistance is suitably used as the rubber.

For example, PTL 1 discloses a crosslinked rubber composition including a nitrile group-containing highly-saturated copolymer rubber and a polyamine-based crosslinking agent, the nitrile group-containing highly-saturated copolymer rubber including $\alpha, \beta$-ethylenically unsaturated nitrile monomer units, $\alpha, \beta$-ethylenically unsaturated dicarboxylic acid monoester monomer units, and conjugated diene monomer units, wherein at least parts of the conjugated diene monomer units are hydrogenated, and an iodine value is 20 or more and 75 or less.

CITATION LIST

Patent Literature

[PTL 1] Japanese Laid-Open Patent Publication No. 2016-6132

SUMMARY OF INVENTION

Technical Problem

However, in recent years, the environment in which rubber parts are used has become severe due to an increase in the output power of internal combustion engines and a long-term use of engine oil under high temperature conditions, and the problem of deterioration of rubber parts has become prominent. Therefore, rubber parts using carboxyl group-containing nitrile rubber are required to further improve mechanical characteristics and water resistance while maintaining a high sealing performance.

It is an object of the present invention to provide a rubber composition capable of providing a rubber crosslinked product having superior mechanical characteristics and water resistance while maintaining a high sealing performance.

Solution to Problem

In order to achieve the above problems, an aspect of the present invention provides a rubber composition including a carboxyl group-containing nitrile rubber of which iodine value is 120 or less, a polyetherester plasticizer, and a metallic compound, wherein an amount of stearic acid adsorbed by the metallic compound is 80 mg/g or more and 300 mg/g or less.

Advantageous Effects of Invention

According to an aspect of the present invention, a rubber composition capable of providing a rubber crosslinked product having superior mechanical characteristics and water resistance while maintaining a high sealing performance can be provided.

DESCRIPTION OF EMBODIMENT

Hereinafter, an embodiment of the present invention will be described in detail. Unless otherwise specified, "parts" and "%" are based on weight.

<Rubber Composition>

A rubber composition according to the embodiment of the present invention includes a carboxyl group-containing nitrile rubber of which iodine value is 120 or less, a polyetherester plasticizer, and a metallic compound, wherein the rubber composition is a rubber composition of which an amount of stearic acid adsorbed by the metallic compound is 80 mg/g or more and 300 mg/g or less.

<Carboxyl Group-Containing Nitrile Rubber>

The carboxyl group-containing nitrile rubber according to the present embodiment is a carboxyl group-containing nitrile rubber of which iodine value is 120 or less. In this specification, the nitrile rubber of which iodine value is 120 or less represents a nitrile copolymer rubber of which the hydrogenation rate is relatively high (which may be hereinafter referred to as a highly-saturated nitrile rubber or a carboxyl group-containing highly-saturated nitrile rubber).

The carboxyl group-containing nitrile rubber used in the present embodiment is not particularly limited as long as the carboxyl group-containing nitrile rubber has an iodine value of 120 or less. An example of carboxyl group-containing nitrile rubber is a nitrile rubber including, for example, $\alpha, \beta$-ethylenically unsaturated nitrile monomer units, $\alpha, \beta$-ethylenically unsaturated dicarboxylic acid monoester monomer units, and conjugated monomer units, wherein at least parts of the conjugated monomer units are hydrogenated.

A specific example of $\alpha, \beta$-ethylenically unsaturated nitrile monomer constituting an $\alpha, \beta$-ethylenically unsaturated nitrile monomer unit is not particularly limited as long as it is an $\alpha, \beta$-ethylenically unsaturated compound having a nitrile group, and examples of $\alpha, \beta$-ethylenically unsaturated nitrile monomers include acrylonitrile; $\alpha$-halogeno acrylonitrile such as $\alpha$-chloroacrylonitrile and $\alpha$-bromoacrylonitrile; $\alpha$-alkyl acrylonitrile such as methacrylonitrile and ethacrylonitrile; and the like. Among them, acrylonitrile and methacrylonitrile are preferable, and acrylonitrile is more preferable. One of the above-mentioned $\alpha, \beta$-ethylenically unsaturated nitrile monomers may be used alone, or two or more of the above-mentioned $\alpha, \beta$-ethylenically unsaturated nitrile monomers may be used in combination.

The content of the $\alpha, \beta$-ethylenically unsaturated nitrile monomer units in the carboxyl group-containing nitrile rubber is, with respect to all the monomer units, normally 5% by weight or more, preferably 10% by weight or more, more preferably 12% by weight or more, and is normally less than 60% by weight, preferably less than 55% by weight, more preferably less than 50% by weight. In this specification, "% by weight" is synonymous with "% by mass". When the content of the $\alpha, \beta$-ethylenically unsaturated nitrile monomer units is too small, the resulting rubber crosslinked product may have a lower oil resistance. Conversely, when the content is too large, the resulting rubber crosslinked product may have a lower cold resistance.

The α, β-ethylenically unsaturated dicarboxylic acid monoester monomer constituting an α, β-ethylenically unsaturated dicarboxylic acid monoester monomer unit is not particularly limited, as long as it is a monoester monomer of a, β-ethylenically unsaturated dicarboxylic acid having one unesterified, unsubstituted (free) carboxyl group. The unsubstituted carboxyl group is mainly used for crosslinking. With the α, β-ethylenically unsaturated dicarboxylic acid monoester monomer unit, a rubber crosslinked product with excellent mechanical characteristics such as elongation and more excellent compression set resistance can be obtained.

An organic group bonding with a carbonyl group via an oxygen atom constituting a part of an ester bond in the α, β-ethylenically unsaturated dicarboxylic acid monoester monomer is preferably an alkyl group, a cycloalkyl group, and an alkyl cycloalkyl group, and is particularly preferably an alkyl group. In a case where the organic group bonding with the carbonyl group is an alkyl group, the number of carbon atoms is preferably 1 or more, more preferably 2 or more, and is preferably 12 or less, more preferably 6 or less. In a case of a cycloalkyl group, the number of carbon atoms is preferably 5 or more, more preferably 6 or more, preferably 12 or less, and more preferably 10 or less. Further, in a case of an alkyl cycloalkyl group, the number of carbon atoms is preferably 6 or more, more preferably 7 or more, preferably 12 or less, and more preferably the number of carbon atoms is 10 or less. When the number of carbon atoms of the organic group bonding with the carbonyl group is too small, the processing stability of the rubber composition may decrease. Conversely, when the number of carbon atoms is too large, the crosslinking rate may be reduced, or the mechanical characteristics of the resulting rubber crosslinked product may be reduced.

Examples of α, β-ethylenically unsaturated dicarboxylic acid monoester monomer constituting an α, β-ethylenically unsaturated dicarboxylic acid monoester monomer unit include monoalkyl maleates such as monomethyl maleate, monoethyl maleate, monopropyl maleate, and mono-n-butyl maleate; monocycloalkyl maleates such as monocyclopentyl maleate, monocyclohexyl maleate, and monocycloheptyl maleate; monoalkyl cycloalkyl maleates such as monomethylcyclopentyl maleate and monoethylcyclohexyl maleate; monoalkyl fumarates such as monomethyl fumarate, monoethyl fumarate, monopropyl fumarate, mono-n-butyl fumarate; monocycloalkyl fumarates such as monocyclopentyl fumarate, monocyclohexyl fumarate, and monocycloheptyl fumarate; monoalkylcycloalkyl fumarates such as monomethylcyclopentyl fumarate and monoethylcyclohexyl fumarate; monoalkyl citraconates such as monomethyl citraconate, monoethyl citraconate, monopropyl citraconate, and mono-n-butyl citraconate; monocycloalkyl citraconates such as monocyclopentyl citraconate, monocyclohexyl citraconate, and monocycloheptyl citraconate; monoalkylcycloalkyl citraconates such as monomethylcyclopentyl citraconate and monoethylcyclohexyl citraconate; monoalkyl itaconates such as monomethyl itaconate, monoethyl itaconate, monopropyl itaconate, and mono-n-butyl itaconate; monocycloalkyl itaconates such as monocyclopentyl itaconate, monocyclohexyl itaconate, and monocycloheptyl itaconate; and monoalkylcycloalkyl itaconates such as monomethylcyclopentyl itaconate and monoethylcyclohexyl itaconate.

Among them, the α, β-ethylenically unsaturated dicarboxylic acid monoester monomer is preferably a monoester of dicarboxylic acid having a carboxyl group at each of the two carbon atoms forming the α, β-ethylenically unsaturated bond, such as, e.g., monopropyl maleate, mono-n-butyl maleate, monopropyl fumarate, mono-n-butyl fumarate, monopropyl citraconate, and mono-n-butyl citraconate, and is more preferably a monoester of a dicarboxylic acid having the two carboxyl groups in the cis position (cis configuration), such as, e.g., mono n-butyl maleate and monopropyl citraconate, and is particularly preferably mono n-butyl maleate. One of the above-mentioned α, β-ethylenically unsaturated dicarboxylic acid monoester monomers may be used alone, or two or more of the above-mentioned α, β-ethylenically unsaturated dicarboxylic acid monoester monomers may be used in combination.

The content of the α, β-ethylenically unsaturated dicarboxylic acid monoester monomer units in the carboxyl group-containing nitrile rubber is, with respect to all the monomer units, normally 0.5% by weight or more, preferably 1% by weight or more, more preferably 2% by weight or more, and is normally 12% by weight or less, preferably 10% by weight or less, more preferably 8% by weight or less. When the content of the α, β-ethylenically unsaturated dicarboxylic acid monoester monomer unit is too small, the mechanical characteristics and the compression set resistance of the resulting rubber crosslinked product may deteriorate. Conversely, when the content is too large, the scorch stability of the rubber composition may deteriorate, and the fatigue resistance of the resulting rubber crosslinked product may be reduced.

Examples of the conjugated monomer constituting the conjugated monomer unit include 1,3-butadiene, isoprene, 2,3-dimethyl-1,3-butadiene, 1,3-pentadiene, chloroprene, and the like. Among them, 1,3-butadiene is preferable.

The content of the conjugated monomer unit in the carboxyl group-containing nitrile rubber is, with respect to all the monomer units, normally 20% by weight or more, preferably 30% by weight or more, and is normally 90% by weight or less, preferably 80% by weight or less, more preferably 65% by weight or less. When the content of the conjugated monomer unit is too low, the rubber elasticity of the resulting rubber crosslinked product may decrease. Conversely, when the content is too high, the chemical stability of the resulting rubber crosslinked product may be impaired.

The carboxyl group-containing nitrile rubber used in the present embodiment may further include (meth) acrylic acid alkyl ester monomer units in addition to the α, β-ethylenically unsaturated nitrile monomer units, the α, β-ethylenically unsaturated dicarboxylic acid monoester monomer units, and the conjugated monomer units. Here, "(meth) acrylic acid" means at least one selected from the group consisting of "acrylic acid" and "methacrylic acid".

Examples of (meth) acrylic acid alkyl ester monomer constituting the (meth) acrylic acid alkyl ester monomer unit include a (meth) acrylic acid ester monomer having a chain or cyclic saturated hydrocarbon group having 1 or more and 8 or less carbon atoms, such as, e.g., methyl (meth) acrylate, ethyl (meth) acrylate, propyl (meth) acrylate, isopropyl (meth) acrylate, n-butyl (meth) acrylate, isobutyl (meth) acrylate, n-amyl (meth) acrylate, isoamyl (meth) acrylate, N-hexyl (meth) acrylate, 2-ethylhexyl (meth) acrylate, cyclohexyl (meth) acrylate, and the like; and a (meth) acrylic acid ester monomer having an alkoxy alkyl group such as methoxymethyl (meth) acrylate, ethoxymethyl (meth) acrylate, 2-ethoxyethyl (meth) acrylate, 2-butoxyethyl (meth) acrylate, 2-methoxyethyl (meth) acrylate, 2-propoxyethyl (meth) acrylate, 3-methoxypropyl (meth) acrylate, 4-methoxybutyl (meth) acrylate, and the like. Among them, the (meth) acrylic acid alkyl ester monomer is preferably a (meth) acrylic acid ester monomer having an alkoxy alkyl group, in which the number of carbon atoms of the alkoxy alkyl group is preferably 2 or more and 8 or less, more preferably 6 or less, and still more preferably 4 or less.

The content of (meth) acrylic acid alkyl ester monomer in the carboxyl group-containing nitrile rubber is, with respect to all the monomer units, normally 12% by weight or more, preferably 15% by weight or more, more preferably 18% by weight or more, and normally 50% by weight or less, preferably 45% by weight or less, more preferably 40% by weight or less. When the (meth) acrylic acid alkyl ester monomer unit is contained at the above content, a rubber crosslinked product having excellent oil resistance and cold resistance can be obtained.

Furthermore, the carboxyl group-containing nitrile rubber used in the present embodiment may further include, in addition to the above monomer unit, another monomer unit of a monomer copolymerizable with the monomer constituting the above monomer unit. Examples of monomers constituting other copolymerizable monomer units include α, β-ethylenically unsaturated carboxylic acid ester monomer (other than the α, β-ethylenically unsaturated dicarboxylic acid monoester monomer and the (meth) acrylic acid alkyl ester monomer explained above), α, β-ethylenically unsaturated monocarboxylic acid monomer, α, β-ethylenically unsaturated polycarboxylic acid monomer, α, β-ethylenically unsaturated polycarboxylic acid anhydrous monomer, aromatic vinyl monomer, fluorine-containing vinyl monomer, copolymerizable nitrogen-containing monomer, and the like.

Examples of α, β-ethylenically unsaturated carboxylic acid ester monomers include an amino group-containing (meth) acrylic acid alkyl ester monomer such as 2-aminoethyl (meth) acrylate and aminomethyl (meth) acrylate; (meth) acrylic acid hydroxy alkyl ester monomer in which the number of carbon atoms of the alkyl group is 1 or more 16 or less, such as 2-hydroxyethyl (meth) acrylate and 3-hydroxypropyl (meth) acrylate; fluoroalkyl group-containing (meth) acrylic acid alkyl ester monomer such as trifluoroethyl (meth) acrylate and difluoromethyl (meth) acrylate; maleic acid dialkyl ester such as dimethyl maleate and di-n-butyl maleate; fumaric acid dialkyl ester such as dimethyl fumarate and di-n-butyl fumarate; maleic acid dicycloalkyl ester such as dicyclopentyl maleate and dicyclohexyl maleate; fumaric acid dicycloalkyl ester such as dicyclopentyl fumarate and dicyclohexyl fumarate; itaconic acid dialkyl ester such as dimethyl itaconate and di-n-butyl itaconate; itaconic acid dicycloalkyl ester such as dicyclohexyl itaconate; and the like.

Examples of α, β-ethylenically unsaturated monocarboxylic acid monomers include acrylic acid, methacrylic acid, ethyl acrylic acid, crotonic acid, cinnamic acid, and the like.

Examples of α, β-ethylenically unsaturated polycarboxylic acid monomers include itaconic acid, fumaric acid, maleic acid, and the like.

Examples of α, β-ethylenically unsaturated polycarboxylic acid anhydrous monomers include maleic anhydride, itaconic anhydride, citraconic anhydride, and the like.

Examples of the aromatic vinyl monomers include styrene, α-methylstyrene, vinylpyridine and the like.

Examples of fluorine-containing vinyl monomers include fluoroethyl vinyl ether, fluoropropyl vinyl ether, ortho-trifluoromethylstyrene, vinyl pentafluorobenzoate, difluoroethylene, tetrafluoroethylene, and the like.

Examples of copolymerizable nitrogen-containing monomers include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like.

One of the above-mentioned copolymerizable other monomers may be used alone, or two or more of the above-mentioned copolymerizable other monomers may be used in combination. The content of the other monomer units is, with respect to all the monomer units constituting the carboxyl group-containing nitrile rubber, preferably 50% by weight or less, more preferably 30% by weight or less, and still more preferably 10% by weight or less.

The iodine value of the carboxyl group-containing nitrile rubber used in the present embodiment is 120 or less, preferably 60 or less, more preferably 40 or less, and particularly preferably 20 or less. When the iodine value of carboxyl group-containing nitrile rubber is too low, the cold resistance of the resulting rubber crosslinked product may be reduced. Conversely, when the iodine value is too high, the heat resistance of the resulting rubber crosslinked product may be reduced.

As a method of making the iodine value of the carboxyl group-contained nitrile rubber used in the present embodiment within the above-described range, for example, there is a method of controlling the iodine value by appropriately adjusting the type of hydrogenation catalyst, the amount of hydrogenation catalyst, the reaction temperature, the hydrogen pressure, and the reaction time of the hydrogenation reaction for producing carboxyl group-contained nitrile rubber.

Specifically, the higher the amount of hydrogenation catalyst is, the lower the iodine value becomes, and similarly, the iodine value may decrease when the reaction temperature or the hydrogen pressure is increased or the reaction time is increased. Therefore, in the present embodiment, the iodine value can be controlled by appropriately adjusting these conditions.

The Polymer Mooney viscosity (ML1+4, 100 degrees Celsius) of the carboxyl group-containing nitrile rubber used in the present embodiment is preferably 10 or more, more preferably 15 or more, still more preferably 20 or more, preferably 200 or less, more preferably 150 or less, still more preferably 100 or less, and particularly preferably 70 or less. When the Polymer Mooney viscosity is in the above range, the processability of the rubber composition can be increased without compromising the mechanical characteristics of the resulting rubber crosslinked product.

The method for producing the carboxyl group-containing nitrile rubber used in the present embodiment is not particularly limited, but it is preferable to prepare latex of the nitrile rubber by copolymerizing the monomers by emulsifying the monomers with an emulsifying agent and to hydrogenate the latex of the nitrile rubber, thus preparing the carboxyl group-containing nitrile rubber. For emulsion polymerization, commonly used polymerization auxiliary materials such as emulsifiers, polymerization initiators, molecular weight modifiers, and the like may be used.

Examples of emulsifiers include, but are not limited to, nonionic emulsifiers such as polyoxyethylene alkyl ether, polyoxyethylene alkyl phenol ether, polyoxyethylene alkyl ester, and polyoxyethylene sorbitan alkyl ester; anionic emulsifiers such as fatty acid salts such as myristic acid, palmitic acid, oleic acid, and linolenic acid, alkyl benzene sulfonate salts such as sodium dodecylbenzenesulfonate, higher alcohol sulfate ester salts, and alkyl sulfosuccinate salts; copolymerizable emulsifiers such as sulfoester of α, β-unsaturated carboxylic acid, sulfate ester of α, β-unsaturated carboxylic acid, and sulfoalkyl aryl ether; and the like. The amount of the emulsifier to be used is preferably 0.1 parts by weight or more and 10 parts by weight or less with respect to all the monomers represented as 100 parts by weight.

The polymerization initiator is not particularly limited as long as it is a radical initiator, but examples of polymerization initiators include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyro nitrile, azobis-2,4-dimethylvalero nitrile, azobiscyclohexanecarbonitrile, and methyl azobisisobutyrate; and the like. One of the above-mentioned polymerization initiators can be used alone, or two or more of the above-mentioned polymerization initiators can be used in combination. As the polymerization initiator, an inorganic or organic peroxide is preferable. When a peroxide is used as a polymerization initiator, it can be used as a redox polymerization initiator in combination with a reducing agent such as sodium bisulfite or ferrous sulfate. The amount of the polymerization initiator to be used is preferably 0.01 parts by weight or more and 2 parts by weight or less with respect to all the monomers represented as 100 parts by weight.

The molecular weight modifier is not particularly limited, but examples of molecular weight modifiers include mercaptans such as t-dodecyl mercaptan, n-dodecyl mercaptan, and octyl mercaptan; halogenated hydrocarbons such as carbon tetrachloride, methylene chloride, and methylene bromide; α-methylstyrene dimers; and sulfur containing compound such as tetraethylthiuram disulfide, dipentamethylenethiuram disulfide, and diisopropylxanthogen disulfide. One of the above-mentioned molecular weight modifiers can be used alone, or two or more of the above-mentioned molecular weight modifiers can be used in combination. Among them, mercaptans are preferable, and t-dodecyl mercaptan is more preferable. The amount of molecular weight modifier to be used is preferably 0.1 parts by weight or more and 0.8 parts by weight or less with respect to all the monomers represented as 100 parts by weight.

Water is normally used as a medium for emulsion polymerization. The amount of water is 80 parts by weight or more and 500 parts by weight or less with respect to all the monomers represented as 100 parts by weight.

For emulsion polymerization, further, polymerization auxiliary materials such as stabilizer, dispersant, pH adjuster, deoxidizer, particle size adjuster, and the like may be used as necessary. When these are used, neither the type nor the amount to be used is particularly limited.

Then, a carboxyl group-containing nitrile rubber is produced by causing the nitrile rubber in the resulting nitrile rubber latex to react in a hydrogenation reaction in which the double bonds of the conjugated monomer units are selectively hydrogenated.

The hydrogenation may be performed by a known method, such as an oil layer hydrogenation method in which the latex of the nitrile rubber obtained by emulsion polymerization is coagulated and then hydrogenated in an oil layer, or an aqueous layer hydrogenation method in which the latex obtained by polymerization is directly hydrogenated, but among them, the aqueous layer hydrogenation method is preferable.

In the hydrogenation of the nitrile rubber by the aqueous layer hydrogenation method, it is preferable to dilute the latex of the nitrile rubber prepared by emulsion polymerization by adding water, if necessary, to carry out the hydrogenation reaction. The aqueous layer hydrogenation method includes an aqueous layer direct hydrogenation method for performing the hydrogenation by supplying hydrogen to the reaction system under the presence of a hydrogenation catalyst, and an aqueous indirect hydrogenation method for performing hydrogenation by reduction under the presence of an oxidizing agent, a reducing agent, and an activator, but the aqueous layer direct hydrogenation method is more preferable.

The hydrogenation catalyst used for the aqueous layer direct hydrogenation method may be any compound that is not readily decomposed in water, and is not particularly limited. Examples of hydrogenation catalysts include a palladium catalyst and the like.

Specific examples of palladium catalysts include palladium salts of carboxylic acids such as formic acid, acetic acid, propionic acid, lauric acid, succinic acid, oleic acid, and phthalic acid; palladium chlorides such as palladium chloride, dichloro (cyclooctadiene) palladium, dichloro (norbornadiene) palladium, and ammonium hexachloropalladate (IV); palladium iodides such as palladium iodide; palladium sulfate/dihydrate; and the like. Among these, palladium salts of carboxylic acids, dichloro (norbornadiene) palladium, and ammonium hexachloropalladium (IV) are particularly preferable.

The amount of the hydrogenation catalyst to be used may be determined as appropriate, according to the type of hydrogenation catalyst to be used and the iodine value to be sought for, but the content of the palladium catalyst for the nitrile rubber before the hydrogenation is preferably 200 ppm by weight or more, more preferably 300 ppm by weight or more, and is preferably 3000 ppm by weight or less, and more preferably 2500 ppm by weight or less.

The reaction temperature, the hydrogen pressure, and the reaction time in the aqueous layer direct hydrogenation method can be determined as appropriate according to the iodine value to be sought for, but the reaction temperature is preferably 30 degrees Celsius or more, more preferably 40 degrees Celsius or more, preferably 70 degrees Celsius or less, and more preferably 60 degrees Celsius or less. The hydrogen pressure is preferably 1 MPa or more, more preferably 2 MPa or more, preferably 5 MPa or less, and more preferably 4 MPa or less. The reaction time is preferably 4 hours or more, more preferably 5 hours or more, and preferably 8 hours or less.

Then, coagulation with salting out, filtration, drying, and the like are performed on the latex hydrogenated in the hydrogenation reaction thus obtained, and as a result, a carboxyl group-containing nitrile rubber can be obtained. In this case, the steps of the filtration and the drying subsequent to the coagulation can be performed by known methods.

<Polyetherester Plasticizer>

The rubber composition according to the present embodiment includes a polyetherester plasticizer in addition to the carboxyl group-containing nitrile rubber described above. The polyetherester plasticizer is a plasticizer including a polyether structure and an ester structure, normally having a weight-average molecular weight of about 300 or more and 5000 or less.

Examples of polyetherester plasticizers include aliphatic carboxylic acid diester compounds of polyalkylene glycol and the like.

Examples of polyalkylene glycols of aliphatic carboxylic acid diester compounds of polyalkylene glycols include polyethylene glycol, polypropylene glycol, polytetramethylene glycol, and the like.

Examples of aliphatic carboxylic acids of the aliphatic carboxylic acid diester compounds of the polyalkylene glycol include diheptanoate, di-2-ethylhexanoate, didecanoate, dodecanoate, and the like.

The amount of polyetherester plasticizer to be compounded in the rubber composition according to the present embodiment is, with respect to the carboxyl group-containing nitrile rubber represented as 100 parts by weight, normally 2 parts by weight or more, preferably 3 parts by weight or more, still more preferably 4 parts by weight or more, and is normally 35 parts by weight or less, preferably 30 parts by weight or less, still more preferably 25 parts by weight or less. When the amount of the polyetherester plasticizer to be compounded is too small, the compression set resistance of the rubber crosslinked product cannot be sufficiently obtained. Conversely, when the amount to be compounded is too large, the mechanical characteristics of the rubber crosslinked product may decrease.

<Metallic Compound>

In the rubber composition according to the present embodiment, a metallic compound is compounded in addition to the carboxyl group-containing nitrile rubber and the polyetherester-based plasticizer. In the present embodiment, a metallic compound having a predetermined amount of stearic acid adsorption is used as the metallic compound.

In this specification, the "amount of stearic acid adsorption" is an amount of stearic acid adsorption calculated by charging a metallic compound into a dioctyl phthalate solution of stearic acid, stirring it at 105 degrees Celsius for 60 minutes, and measuring the concentration of the stearic acid in the dioctyl phthalate solution.

The amount of the stearic acid adsorbed by the metallic compound is normally 80 mg/g or more, preferably 90 mg/g or more, more preferably 100 mg/g or more, and is normally 300 mg/g or less, preferably 280 mg/g or less, more preferably 260 mg/g or less. In order to improve the compression set resistance of the rubber crosslinked product, the amount of the stearic acid adsorbed by the metallic compound is more preferably 100 mg/g or more and 200 mg/g or less. When the amount of the stearic acid adsorbed by the metallic compound is too low, the mechanical characteristics of the rubber crosslinked product may decrease, and the water resistance cannot be obtained sufficiently. On the contrary, when the amount of stearic acid adsorption is too high, the compression set resistance of the rubber crosslinked product may decrease.

In this manner, the rubber composition according to the present embodiment includes a carboxyl group-containing nitrile rubber of which iodine value is 120 or less, a polyetherester plasticizer, and a metallic compound, wherein the amount of the stearic acid adsorbed by the metallic compound is 80 mg/g or more and 300 mg/g or less. Therefore, according to the rubber composition according to the present embodiment, a rubber composition capable of providing a rubber crosslinked product having superior mechanical characteristics and water resistance while maintaining a high sealing performance can be provided.

The metallic compound is not particularly limited as long as the metallic compound has the above-mentioned amount of stearic acid adsorption, but examples of metallic compounds include oxides, hydroxides, carbonates, basic salts, complex oxides such as hydrotalcites, and the like of at least one element selected from the group consisting of elements belonging to Group 2, elements belonging to Group 12, elements belonging to Group 13, and elements belonging to Group 14 of the periodic table.

The hydrotalcites are compounds represented by a general formula $Mg_xAl_y(OH)_{2x+3y-2}CO_3 \cdot wH_2O$ (however, x denotes a number of 1 or more and 10 or less, y denotes a number of 1 or more and 5 or less, and w denotes a real number), and specifically, examples of hydrotalcites include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, and $Mg_3Al_2(OH)_{10}CO_3 \cdot 1.7H_2O$, and the like.

Specific examples of metallic compounds include, for example, magnesium oxide, zinc oxide, aluminum oxide, aluminum magnesium oxide (aluminum magnesium oxide), tin oxide, lead oxide, magnesium hydroxide, calcium hydroxide, barium hydroxide, aluminum hydroxide, magnesium carbonate, calcium oxide, barium carbonate, hydrotalcite, magnesium silicate, calcium silicate, aluminum silicate, calcium stearate, zinc stearate, tin stearate, calcium phthalate, calcium phosphite, basic lead phosphite, basic tin phosphite, basic lead sulfite, basic lead dibasic lead phthalate, basic lead dibasic lead phthalate, dibasic lead carbonate, and tribasic lead sulfate. Among them, aluminum oxide, aluminum oxide, aluminum magnesium oxide, calcium hydroxide, magnesium hydroxide, aluminum hydroxide, hydrotalcite, aluminum silicate, magnesium silicate, and calcium silicate are preferable in order to avoid heavy metal that is a source of environmental pollution and to achieve excellent thermal stability, and aluminum hydroxide, aluminum magnesium oxide, and hydrotalcite are more preferable in order to improve mechanical characteristics and water resistance of the rubber crosslinked product while maintaining high compression set resistance of the resulting rubber crosslinked product. One of the above-mentioned metallic compounds may be used alone, or two or more of the above-mentioned metallic compounds may be used in combination.

The amount of the metallic compound to be compounded is not particularly limited, but is, with respect to the carboxyl group-containing nitrile rubber represented as 100 parts by weight, preferably 0.5 parts by weight or more, more preferably 1 part by weight or more, preferably 15 parts by weight or less, more preferably 12 parts by weight or less, and still more preferably 10 parts by weight or less. When the amount of the metallic compounds is small, the water resistance of the rubber crosslinked product cannot be obtained sufficiently. Conversely, when the amount of the metallic compounds is too large, the hardness of the rubber crosslinked product may become too high or the compression set resistance may be reduced.

In order to control the amount of stearic acid adsorption, a nitrogen adsorption specific surface area of the metallic compound according to the present embodiment is preferably 30 m$^2$/g or more, more preferably 40 m$^2$/g or more, still more preferably 50 m$^2$/g or more, and is preferably 300 m$^2$/g or less, more preferably 270 m$^2$/g or less, still more preferably 250 m$^2$/g or less. In this specification, the "nitrogen adsorption specific surface area" represents a specific surface area measured according to a BET method based on JIS K 6217.

In this manner, the metallic compound of which nitrogen adsorption specific surface area is 30 m$^2$/g or more and 300 m$^2$/g or less is used, so that the pore volume of each particle constituting the metallic compound is controlled, and this allows to readily select the metallic compound of which the amount of stearic acid adsorption is 80 mg/g or more and 300 mg/g or less. When the nitrogen adsorption specific surface area of the metallic compound is too small, the amount of the stearic acid adsorbed by the metallic compound becomes too low, and the mechanical characteristics of the rubber crosslinked product are reduced, so that the water resistance cannot be obtained sufficiently. Conversely, when the nitrogen adsorption specific surface area of the metallic compound becomes too large, the amount of the stearic acid adsorbed by the metallic compound becomes too high, so that the compression set resistance of the rubber crosslinked product may be reduced.

In order to further control the above amount of stearic acid adsorption, an average particle size D50 of the metallic compound according to the present embodiment is preferably 1 μm or more, more preferably 2 μm or more, still more preferably 3 μm or more, and is preferably 350 μm or less, more preferably 250 μm or less, and still more preferably 150 μm or less. In this specification, the "average particle size D50" indicates a particle size at which a volume-based cumulative distribution measured by the laser diffraction/scattering method becomes 50%.

In this manner, the metallic compound of which average particle size D50 is 1 μm or more and 350 μm or less is used, so that in the amount of stearic acid adsorption, the number of adsorption points of the metallic compound is controlled, and this allows to readily select the metallic compound of which the amount of stearic acid adsorption is 80 mg/g or more and 300 mg/g or less. When the average particle size D50 of the metallic compound is too large, the amount of the stearic acid adsorbed by the metallic compound becomes too low, and the mechanical characteristics of the rubber crosslinked product are reduced, so that the water resistance cannot be obtained sufficiently. Conversely, when the average particle size D50 of the metallic compound is too small, the amount of the stearic acid adsorbed by the metallic compound becomes too high, so that the compression set resistance of the rubber crosslinked product may be reduced.

In addition to the above, the rubber composition according to the present embodiment can be formulated with a compounding ingredient commonly used in the technical field of rubber. Examples of such compounding ingredients include fillers, plasticizers (other than polyether ester-based plasticizers), crosslinking agents, crosslinking promoters, crosslinking aids, crosslinking retarders, antiaging agents, antioxidants, light stabilizers, antiscorching agents, silane coupling agents, processing aids (other than silane coupling agents), glidants, adhesives, lubricants, fire retardants, mold acceptors, acid acceptors (other than the above-described metallic compounds), antistatic agents, pigments, and the like. The amount of the compounding ingredient to be compounded is not particularly limited as long as the compounding ingredient does not interfere with the purpose or effect of the present invention, and the amount may be appropriately compounded according to the purpose of the compounding.

The filler is not particularly limited, and a carbon-based material such as carbon black, graphite, or the like can be used as the filler. Among them, carbon black is preferable. Specific examples of carbon blacks include furnace black, acetylene black, thermal black, channel black, and the like. Among these, it is preferable to use furnace black, and examples thereof include SAF, ISAF, ISAF-HS, ISAF-LS, IISAF-HS, HAF, HAF-HS, HAF-LS, MAF, FEF, and the like, and among them, FEF, MAF, and HAF-HS are particularly preferable. Specific examples of graphite include: natural graphite such as scaly graphite and flake graphite; and artificial graphite. One of the above-mentioned carbon-based materials may be used alone, or two or more of the above-mentioned carbon-based materials may be used in combination. The addition amount of the filler is 40 parts by weight or more and 90 parts by weight or less with respect to the acrylic rubber, represented as 100 parts by weight, in the acrylic rubber composition.

Examples of fillers other than carbon-based materials include metal powders such as, for example, aluminum powder; inorganic powders such as hard clays, talc, calcium carbonate, titanium oxide, calcium sulfate, calcium carbonate, aluminum hydroxide; powders such as organic powders such as starch and polystyrene powder; short fibers such as glass fibers (mild fibers), carbon fibers, aramid fibers, potassium titanate whiskers; silica, mica; and the like. One of the above-mentioned fillers may be used alone, or two or more of the above-mentioned fillers may be used in combination.

The addition amount of the filler in the rubber composition according to the present embodiment is, with respect to the carboxyl group-containing nitrile rubber represented as 100 parts by weight, preferably 0 parts by weight or more, more preferably 1 part by weight or more, still more preferably 5 parts by weight or more, and is preferably 200 parts by weight or less, more preferably 150 parts by weight or less, still more preferably 100 parts by weight or less.

The plasticizer is not particularly limited as long as it is a plasticizer other than the polyether ester-based plasticizer. Examples of the plasticizers other than the polyether ester-based plasticizer include a trimellitic acid-based plasticizer, a pyromellitic acid-based plasticizer, a polyester-based plasticizer, a phthalate-based plasticizer, an adipate-based plasticizer, a phosphate-based plasticizer, a sebacate-based plasticizer, an alkyl sulfonate-based plasticizer, an epoxylated vegetable oil-based plasticizer, and the like. Specific examples thereof include tri-2-ethylhexyl trimellitate, isononyl trimellitate, mixed strand alkyl ester trimellitate, dipentaerythritol ester, 2-ethylhexyl pyromellitic acid, bis[2-(2-butoxyethoxy)ethyl]adipate, dioctyl adipate, adipic acid-based polyester (molecular weight of about 300 or more and 5000 or less), dioctyl phthalate, diisononyl phthalate, dibutyl phthalate, tricresyl phosphate, dibutyl sebacate, alkyl sulfonic acid phenyl ester, epoxidized soybean oil, diheptanoate, di-2-ethylhexanoate, didecanoate, and the like. One of the above-mentioned plasticizers may be used alone, or two or more of the above-mentioned plasticizers may be used in combination.

The amount of the plasticizer other than the polyether ester-based plasticizer to be compounded in the rubber composition according to the present embodiment is, with respect to the carboxyl group-containing nitrile rubber represented as 100 parts by weight, preferably 0 parts by weight or more, more preferably 0.5 parts by weight or more, still more preferably 1 part by weight or more, and preferably 50 parts by weight or less, more preferably 30 parts by weight or less, still more preferably 10 parts by weight or less.

Examples of the silane coupling agent include, but are not limited to, epoxy silane coupling agents such as γ-glycidyloxypropyltrimethoxysilane, γ-glycidyloxypropylmethyldiethoxysilane, β-(3,4-epoxycyclohexyl) ethyltrimethoxysilane, and the like; vinyl silane coupling agents such as vinyltrimethoxysilane, vinyltriethoxysilane, vinyltris(2-methoxyethoxy) silane, and the like; methacryloxy silane coupling agents such as γ-(methacryloyloxypropyl) trimethoxysilane; amino silane coupling agents such as N-β-(aminoethyl)-γ-aminopropyltrimethoxysilane, γ-aminopropyltriethoxysilane, and the like; mercapto silane coupling agents such as γ-mercaptopropyltrimethoxysilane. One of the above-mentioned silane coupling agents may be used alone, or two or more of the above-mentioned silane coupling agents may be used in combination.

The amount of the silane coupling agent to be compounded in the rubber composition according to the present embodiment is, with respect to the carboxyl group-containing nitrile rubber represented as 100 parts by weight, preferably 0 parts by weight or more, more preferably 0.1 parts by weight or more, still more preferably 0.2 parts by weight or more, and is preferably 20 parts by weight or less, more preferably 15 parts by weight or less, still more preferably 10 parts by weight or less.

The crosslinking agent is not particularly limited, and for example, a polyamine-based crosslinking agent, a sulfur crosslinking agent, an organic peroxide crosslinking agent, and the like can be used as the crosslinking agent. One of the above-mentioned crosslinking agents may be used alone, or two or more of the above-mentioned crosslinking agents may be used in combination. Among them, in order to enhance the compression set resistance of the resulting rubber crosslinked product, the polyamine-based crosslinking agent is preferable.

Specific examples of the polyamine-based crosslinking agent include aliphatic polyamines such as hexamethylenediamine, hexamethylenediamine carbamate, N,N-dicinnamylidene-1,6-hexanediamine, tetramethylenepentamine, and hexamethylenediamine cinnamaldehyde adduct; aromatic polyamines such as 4,4-methylenedianiline, m-phenylenediamine, 4,4-diaminodiphenyl ether, 3,4-diaminodiphenyl ether, 4,4-(m-phenylenediisopropylidene) dianiline, 4,4-(p-phenylenediisopropylidene) dianiline, 2,2-bis[4-(4-aminophenoxy)phenyl]propane, 4,4-diaminobenzanilide, 4,4-bis (4-aminophenoxy) biphenyl, m-xylylenediamine, p-xylylenediamine, and 1,3,5-benzenetriamine; and polyhydrazides such as isophthalic dihydrazide, terephthalic dihydrazide, phthalic dihydrazide, 2,6-naphthalene dicarboxylic acid dihydrazide, naphthalene dihydrazide, oxalic dihydrazide, malonic dihydrazide, succinic dihydrazide, glutamic dihydrazide, adipic dihydrazide, pimelic dihydrazide, suberic dihydrazide, azelaic dihydrazide, sebacic dihydrazide, brassyl dihydrazide, dodecane diacid dihydrazide, acetone dicarboxylic acid dihydrazide, fumaric acid dihydrazide, maleic acid dihydrazide, itaconic acid dihydrazide, trimellitic acid dihydrazide, 1,3,5-benzenetricarboxylic acid dihydrazide, aconitic dihydrazide, pyromellitic dihydrazide, and the like. Among them, the hexamethylenediamine carbamate is particularly preferable.

Examples of organic peroxide crosslinking agent include dicumyl peroxide, cumene hydroperoxide, t-butyl cumyl peroxide, paramenthane hydroperoxide, di-t-butyl peroxide, 1,3-bis(t-butylperoxyisopropyl)benzene, 1,4-bis (t-butylperoxyisopropyl)benzene, 1,1-di-t-butylperoxy-3,3-trimethylcyclohexane, 4,4-bis-(t-butyl-peroxy)-n-butylvalerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butyl peroxyisopropyl carbonate, t-butyl peroxybenzoate, and the like. Among them, 1,3-bis(t-butylperoxyisopropyl) benzene is preferable. One of the above-mentioned organic peroxide crosslinking agents may be used alone, or two or more of the above-mentioned organic peroxide crosslinking agents may be used in combination.

The amount of the crosslinking agent to be compounded in the rubber composition according to the present embodiment is, with respect to the carboxyl group-containing nitrile rubber represented as 100 parts by weight, preferably 0.1 parts by weight or more, more preferably 0.2 parts by weight or more, still more preferably 0.5 parts by weight or more, and is preferably 20 parts by weight or less, more preferably 15 parts by weight or less, still more preferably 10 parts by weight or less. When the amount of the crosslinking agent to be compounded is too small, the compression set resistance of the resulting rubber crosslinked product may not be obtained sufficiently. Conversely, when the amount is too large, the mechanical characteristics of the rubber crosslinked product may not be obtained sufficiently.

The crosslinking promoter is not particularly limited as long as it promotes crosslinking in combination with a crosslinking agent. Examples of crosslinking promoters include aliphatic monovalent secondary amine compound, aliphatic monovalent tertiary amine compound, guanidine compound, imidazole compound, quaternary onium salt, tertiary phosphine compound, alkali metal salt of weak acid, diazabicycloalkene compound, and the like. Among them, aliphatic monovalent secondary amine compounds, aliphatic monovalent tertiary amine compounds, guanidine compounds, and diazabicycloalkene compounds are preferable. One of the above-mentioned crosslinking promoters may be used alone, or two or more of the above-mentioned crosslinking promoters may be used in combination.

As the crosslinking promoter used in combination with the above polyamine-based crosslinking agent, it is preferable to use a basic crosslinking promoter. Specific examples of basic crosslinking promoters include basic crosslinking promoters with cyclic amidine structures such as, for example, 1,8-diazabicyclo[5,4,0]undecene-7 (which may be hereinafter abbreviated as "DBU"), 1,5-diazabicyclo[4,3,0] nonene-5,1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; guanidine basic crosslinking promoters such as tetramethylguanidine, tetraethylguanidine, diphenylguanidine, 1,3-di-ortho-tolylguanidine, and ortho-tolylbiguanide; aldehydeamine basic crosslinking promoters such as n-butyraldehyde aniline and acetaldehyde ammonia; dicycloalkyl amines such as dicyclopentylamine, dicyclohexylamine, and dicycloheptylamine; and secondary amine basic promoters such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-2-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, di(3-chlorocyclopentyl)amine, and the like. Among them, the guanidine basic crosslinking promoters, the secondary amine basic promoters, and the basic crosslinking promoters with cyclic amidine structures are preferable, and 1,8-diazabicyclo[5,4,0]undecene-7 and 1,5-diazabicyclo[4,3,0]nonene-5 are more preferable, and 1,8-diazabicyclo[5,4,0]undecene-7 is particularly preferable.

The basic crosslinking promoter having the cyclic amidine structure may form a salt with an organic carboxylic acid, an alkyl phosphoric acid or the like. The secondary amine basic crosslinking promoter may also be a mixture with alcohols such as alkylene glycols or alkyl alcohols of which the number of carbon atoms is 5 or more and 20 or less, and may further include inorganic and/or organic acids. The secondary amine basic crosslinking promoter and the inorganic and/or organic acid may further form a salt and form a complex with the alkylene glycol.

The amount of the crosslinking promoter to be compounded in the rubber composition according to the present embodiment is, with respect to the carboxyl group-containing nitrile rubber represented as 100 parts by weight, preferably 0.1 parts by weight or more, more preferably 0.2 parts by weight or more, still more preferably 0.5 parts by weight or more, and is preferably 20 parts by weight or less, more preferably 15 parts by weight or less, still more preferably 10 parts by weight or less. When the amount of the crosslinking promoter to be compounded is too small, the compression set resistance of the resulting rubber crosslinked product may not be obtained sufficiently. Conversely, when the amount to be compounded is too large, the mechanical characteristics of the rubber crosslinked product may not be obtained sufficiently.

Antioxidants are not particularly limited. For example, phenol-based, amine-based, phosphate-based, and sulfur-based antioxidants can be used. A typical example of phenol-based antioxidant includes 2,2-methylenebis(4-methyl-6-t-butylphenol), and a typical example of amine-based antioxidant includes 4,4'-bis($\alpha,\alpha$-dimethylbenzyl)diphenylamine. One of the above-1 mentioned antioxidants may be used alone, or two or more of the above-mentioned antioxidants may be used in combination.

In addition, the rubber composition according to the present embodiment may contain other polymers other than the above-described carboxyl group-containing nitrile rubber as long as the effect of the present invention is not impaired. Examples of other polymers include acrylic rubber, ethylene-acrylic acid copolymer rubber, fluoro rubber, styrene-butadiene copolymer rubber, ethylene-propylene copolymer rubber, ethylene-propylene-diene ternary copolymer rubber, natural rubber, polyisoprene rubber, and the like. In a case where other polymers are compounded, the amount of the rubber composition to be compounded is, with respect to the carboxyl group-containing nitrile rubber represented as 100 parts by weight, preferably 30 parts by weight or less, more preferably 20 parts by weight or less, still more preferably 10 parts by weight or less.

The rubber composition according to the present embodiment is prepared by mixing the above components preferably in a non-aqueous system. The method of preparing the rubber composition according to the present embodiment is not limited thereto. Usually, the rubber composition according to the present embodiment can be prepared by primarily kneading components, except for the crosslinking agent and the crosslinking promoter susceptible to heat, with a mixer such as a Banbury mixer, an intermixer, or a kneader, transferring the mixture to a roll or the like, adding the crosslinking agent, the crosslinking promoter, or the like susceptible to heat, to the mixture, and secondarily kneading the mixture.

From the viewpoint of workability, the Mooney viscosity (ML1+4, 100 degrees Celsius) of the rubber composition according to the present embodiment is preferably 10 or more, more preferably 15 or more, still more preferably 20 or more, particularly preferably 30 or more, and is preferably 200 or less, more preferably 150 or less, still more preferably 120 or less, and particularly preferably 100 or less.

<Rubber Crosslinked Product>

The rubber crosslinked product according to the embodiment of the present invention is obtained by crosslinking the rubber composition according to the present embodiment described above.

The rubber crosslinked product according to the present embodiment can be produced by using the rubber composition according to the present embodiment, molding the rubber composition with a molding machine supporting a desired shape, such as, for example, an extruder, an injection molding machine, a compressor, a roll, and the like, performing crosslinking reaction by heating the rubber composition, and fixing the shape as the crosslinked product. In this case, the crosslinking may be performed after the rubber composition is molded in advance, or crosslinking may be performed simultaneously with molding. The molding temperature is normally 10 degrees Celsius or more, preferably 25 degrees Celsius or more, and is normally 200 degrees Celsius or less, preferably 120 degrees Celsius or less. The crosslinking temperature is normally 100 degrees Celsius or more, preferably 130 degrees Celsius or more, and is normally 200 degrees Celsius or less, preferably 190 degrees Celsius or less. Furthermore, the crosslinking time is normally 1 minute or more, preferably 2 minutes or more, and is normally 1 hour or less, preferably 30 minutes or less.

Also, depending on the shape, the size, and the like of the rubber crosslinked product, the inner portion may not be sufficiently crosslinked even if the surface is crosslinked. Therefore, secondary crosslinking may be performed by further applying heat. As the heating method, a generally-available method used for crosslinking rubber such as press heating, steam heating, oven heating, hot air heating, and the like may be selected as appropriate.

The rubber crosslinked product according to the present embodiment thus obtained has superior mechanical characteristics and water resistance while maintaining compression set resistance as the rubber crosslinked product of the carboxyl group-containing nitrile rubber. Therefore, the composition according to the present embodiment, for example, can be suitably used for a wide range of applications such as radiator caps for automobiles and machine tools, metal gaskets, oil seals, anti-vibration rubber, water pump seals, mechanical seals, and the like.

The rubber crosslinked product according to the present embodiment obtained as described above is a rubber crosslinked product of which a volume change rate obtained when the rubber crosslinked product is immersed in distilled water at 80 degrees Celsius for 168 hours (hereinafter referred to as a volume change rate) is equal to or less than 10%. In this specification, the volume change rate indicates a volume change rate (%) obtained by immersing the rubber crosslinked product in distilled water under the conditions of 80 degrees Celsius for 168 hours and calculating the volume of the rubber crosslinked product before and after the immersion according to JIS K 6258.

In the production of carboxyl group-contained nitrile rubber, when the latex is solidified, halogen (for example, chlorine) derived from coagulant and metal (for example, sodium, calcium, and magnesium) may be mixed or may remain in the carboxyl group-containing nitrile rubber. In addition, when the solidified carboxyl group-containing nitrile rubber is filtered, the solids (crumbs) are washed, but it is difficult to completely remove the halogen or halogen compound and the metal. Therefore, the carboxyl group-containing nitrile rubber tends to include the halogen or halogen compound and the metal. Therefore, the conventional carboxyl group-containing nitrile rubber has a volume change rate of more than 10% due to the effects of the residual halogen and the residual metal, and it cannot be said that the water resistance of the rubber crosslinked product is sufficient.

In contrast, the rubber crosslinked product according to the present embodiment obtained from the above rubber composition is less affected by the residual halogen and the residual metal during the production of the carboxyl group-containing nitrile rubber, and accordingly, the rubber crosslinked product with the volume change rate of 10% or less can be obtained. Therefore, the rubber crosslinked product according to the present embodiment achieves excellent water resistance.

EXAMPLES

Hereinafter, the present invention will be described in more detail with reference to Examples and Comparative Examples. The test and evaluation methods of physical properties and characteristics are as follows.

<Composition of Carboxyl Group-Containing Nitrile Rubber>

The contents of monomer units constituting the carboxyl group-containing nitrile rubber were measured according to the following method. Specifically, the content of mono-n-butyl maleate units was calculated by adding 100 mL of 2-butanone to 0.2 g of carboxyl group-contained nitrile rubber in a 2 mm-side square, stirring it for 4 hours, then adding 20 mL of ethanol and 10 mL of water, and using a 0.02 N aqueous ethanol solution of potassium hydroxide while stirring the solution, titrating the solution with thymolphthalein used as an indicator at a room temperature to determine the number of moles of the carboxyl group with respect to 100 g of carboxyl group-containing nitrile rubber, and converting the obtained number of moles to the amount of mono-n-butyl maleate unit.

The contents of the 1,3-butadiene units and the hydrogenated butadiene units were calculated by measuring the iodine value (according to JIS K 6235) using a nitrile rubber prior to hydrogenation. The content of acrylonitrile units was calculated by measuring the nitrogen content in the carboxyl group-containing nitrile rubber by the Kjeldahl method according to JIS K 6383. The content of acrylic acid n-butyl was calculated as the remaining component with respect to the above monomer units.

<Iodine Value>

The iodine value of the carboxyl group-containing nitrile rubber (which may hereinafter be collectively referred to as "polymer") was measured according to JIS K 6235.

<Polymer Mooney Viscosity and Mooney Viscosity of Rubber Composition>

The Mooney viscosity (Polymer Mooney viscosity) of the carboxyl group-containing nitrile rubber (ML1+4, 100 degrees Celsius) and the Mooney viscosity of the rubber composition including the polymers (ML1+4, 100 degrees Celsius) were measured according to JIS K 6300. The Mooney viscosity is one of indexes for evaluating processability and the like of the carboxyl group-containing nitrile rubber, other highly-saturated nitrile rubbers, and the rubber composition. The smaller this value is, the higher the processability becomes.

<Normal Physical Property (Elongation)>

The rubber component was placed into a mold having a length of 15 cm, a width of 15 cm, and a depth of 0.2 cm, and was press-molded and crosslinked at 170 degrees Celsius for 20 minutes while applying a pressure of 10 MPa, and thereafter, secondary crosslinking was performed at 170 degrees Celsius for 4 hours, and as a result, a sheet-like rubber crosslinked product was obtained. The resulting sheet-like rubber crosslinked product was punched with a No. 3 dumbbell to prepare a test piece. The resulting test piece was used to measure the elongation (%) of the rubber crosslinked product according to JIS K 6251. When the elongation (%) was less than 180%, the mechanical characteristics were evaluated as good.

<Compression Set>

The rubber component was molded and crosslinked at a press pressure of 10 MPa for 20 minutes at 170 degrees Celsius, and a cylindrical test piece having a diameter of 29 mm and a thickness of 12.5 mms was prepared, and further, secondary crosslinking was performed at 170 degrees Celsius for 4 hours, and as a result, a test piece was obtained. Then, a compression set (%) was measured in accordance with JIS K 6262 under the condition that the obtained secondarily crosslinked test piece was kept at 150 degrees Celsius for 168 hours in a state of being compressed by 25%. When the compression set (%) was less than 50%, the compression set resistance (sealing performance) was evaluated as good.

<Water Resistance Test>

A secondarily crosslinked test piece (rubber crosslinked product) obtained in the normal physical property (elongation) test was punched out into a test piece of 2 cm×3 cm. In accordance with JIS K 6258, a water resistance test was performed by immersing the test piece in distilled water at 80 degrees Celsius for 168 hours. Then, the volume of the rubber crosslinked product before and after the immersion in the distilled water was measured, and the percentage change in the volume after the immersion was calculated. In a case where the volume change rate (%) was less than 10%, the water resistance was evaluated as good.

Production Example

Production Example 1

Production of Carboxyl Group-Containing Highly-Saturated Nitrile Rubber (A)

A metal bottle was charged with, in the following order, 180 parts of ion-exchanged water, 25 parts of 10% aqueous solution of sodium dodecylbenzenesulfonate, 15 parts of acrylonitrile, 5 parts of mono n-butyl maleate, 37 parts of n-butyl acrylate, and 0.75 parts of t-dodecyl mercaptan (molecular weight regulator). After the gas in the inside was replaced with nitrogen three times, 57 parts of 1,3-butadiene were charged.

The metal bottle was kept at 5 degrees Celsius, and 0.1 parts of cumene hydroperoxide (polymerization initiator) was charged, and polymerization reaction was performed for 16 hours while the metal bottle was rotated. Then, 0.1 parts of 10% aqueous solution of hydroquinone (polymerization inhibitor) was added to stop the polymerization reaction, and the residual monomers were removed using a rotary evaporator at a water temperature of 60 degrees Celsius, and as a result, a latex (a solid concentration of about 30% by weight) of an acrylonitrile-butadiene-mono-n-butyl-maleate copolymer rubber was obtained.

In order to attain a palladium content of 2000 ppm with respect to the dry weight of rubber contained in the obtained latex, in an autoclave, the latex produced as described above and a palladium catalyst (a solution obtained by mixing 1% palladium acetate acetone solution and ion-exchanged water at the same mass) were added, and hydrogenation reaction was performed at a hydrogen pressure of 3 MPa and at a temperature of 50 degrees Celsius for 6 hours, and a latex of carboxyl group-containing nitrile rubber (hereinafter referred to as carboxyl group-2-containing highly-saturated nitrile rubber) was obtained.

Subsequently, the obtained latex of the carboxyl group-containing highly-saturated nitrile rubber was coagulated. Specifically, the latex obtained above was slowly poured into a vessel in which a sodium chloride solution (a concentration of 25%) was prepared as a coagulant, and then the solution was vigorously stirred to be brought into contact and mixed to coagulate the latex (i.e., salt coagulation), and solids (crumbs) were retrieved by filtration. The solids were cut into small pieces, poured into distilled water, stirred, and filtered to obtain solids. After repeating this operation 5 times, the solids were vacuum-dried at 60 degrees Celsius for 12 hours, and as a result, a carboxyl group-containing highly-saturated nitrile rubber (A) was obtained.

The obtained carboxyl group-containing highly-saturated nitrile rubber (A) had an iodine value of 10, an amount of contained carboxyl group 110 of $2.9 \times 10^{-2}$ ephr, a Polymer Mooney viscosity (ML1+4, 100 degrees Celsius) of 40, a residual chlorine amount of 1200 ppm, and a residual sodium amount of 920 ppm.

The composition of the carboxyl group-containing highly-saturated nitrile rubber (A) was derived through calculation including deriving a content of acrylonitrile units by the Kjeldahl method, deriving a content of mono-n-butyl maleate units from the carboxyl group content, and calculating the remaining component as 1,3-butadiene units. As a result, the composition of the carboxyl group-containing highly-saturated nitrile rubber (A) was determined to include acrylonitrile units at 15.4% by weight, butadiene units (including hydrogenated butadiene units) at 43.5% by weight, acrylic acid n-butyl units at 36.1% by weight, and mono n-butyl maleate units at 5.0% by weight.

Examples and Comparative Examples

Example 1

Using a Banbury mixer, 50 parts of FEF carbon black (trade name "SEAST SO", manufactured by Tokai Carbon Co., Ltd., "SEAST" is a registered trademark, carbon black), 5 parts of polyetherester (trade name "Adeka Cizer RS-735", manufactured by ADEKA CORPORATION, "Adeka Cizer" is a registered trademark, plasticizer) as a polyetherester plasticizer, 1.5 parts of 4,4'-bis (α,α-dimethylbenzyl) diphenylamine (trade name "Naugard 445", manufactured by Crompton Corporation, "Naugard" is a registered trademark, antioxidant), 1 part of stearic acid (trade name "STEARIC ACID CAMELLIA", manufactured by NOF CORPORATION, processing aid), and 1 part of polyoxyethylene alkyl ether phosphate ester (trade name "Phosphanol RL210", manufactured by Kao Corporation, "Phosphanol" is a registered trademark, processing aid) were added to and mixed with 100 parts of the carboxyl group-containing highly-saturated nitrile rubber (A) obtained in the Production Example 1. Subsequently, the obtained mixture was transferred to a roll, and 1.9 parts of hexamethylenediamine carbamate (trade name "Diak #1", manufactured by DuPont de Nemours, Inc., polyamine-based crosslinking agent), 4 parts of 1,8-diazabicyclo[5,4,0]undecene-7 (DBU) (trade name "RHENOGRAN XLA-60"; manufactured by Rhein Chemie; manufactured by "RHENOGRAN"; constituted by a DBU at 60% (including a part being zinc dialkyl diphosphate salt), and an acrylic acid polymer and a dispersant at 40%; basic crosslinking promoter), and 3 parts of aluminum hydroxide as a metallic compound (trade name "KYOWAAD 200S"; manufactured by Kyowa Chemical Industry Co., Ltd., "KYOWAAD" is a registered trademark; a metallic compound having an amount of stearic acid adsorption of 156 mg/g and a nitrogen adsorption specific surface area of 150 m$^2$/g) were added to and mixed with the obtained mixture to prepare a crosslinked rubber composition. Then, with the use of the resulting crosslinked rubber composition, the Mooney viscosity, mechanical characteristics (elongation), sealing performance, and water resistance of the rubber composition were evaluated according to the above method. The results are given in Table 1.

Example 2

The crosslinked rubber composition was prepared and evaluated in a manner similar to Example 1, except that the amount of aluminum hydroxide added as a metallic compound was changed to 5 parts. The results are given in Table 1.

Example 3

The crosslinked rubber composition was prepared and evaluated in a manner similar to Example 1, except that the amount of aluminum hydroxide added as a metallic compound was changed to 10 parts. The results are given in Table 1.

Example 4

The crosslinked rubber composition was prepared and evaluated in a manner similar to Example 1, except that 5 parts of aluminum magnesium oxide (trade name "KW2000", manufactured by Kyowa Chemical Industry Co., Ltd., a metallic compound having an amount of stearic acid adsorption of 250 mg/g and a nitrogen adsorption specific surface area of 185 m$^2$/g) were added as a metallic compound instead of aluminum hydroxide. The results are given in Table 1.

Example 5

The crosslinked rubber composition was prepared and evaluated in a manner similar to Example 1, except that 5 parts of synthetic hydrotalcite (trade name "KYOWAAD 500SH", manufactured by Kyowa Chemical Industry Co., Ltd., a metallic compound having an amount of stearic acid adsorption of 236 mg/g and a nitrogen adsorption specific surface area 110 m$^2$/g) were added as metallic compound instead of aluminum hydroxide. The results are given in Table 1.

Example 6

The crosslinked rubber composition was prepared and evaluated in a manner similar to Example 2, except that 4 parts of processing aid (trade name "Struktol HT750", manufactured by Schill+Seilacher Struktol GmbH, "Struktol" is a registered trademark) were further added. The results are given in Table 1.

Comparative Example 1

The crosslinked rubber composition was prepared and evaluated in a manner similar to Example 1, except that aluminum hydroxide was not added. The results are given in Table 1.

Comparative Example 2

The crosslinked rubber composition was prepared and evaluated in a manner similar to Example 1, except that 5 parts of tri-2-ethylhexyl trimellitate (trade name "ADK Cizer C-8", manufactured by ADEKA CORPORATION, "ADK Cizer" is a registered trademark) were added as a plasticizer instead of polyetherester, and that the aluminum hydroxide was not added. The results are given in Table 1.

Comparative Example 3

The crosslinked rubber composition was prepared and evaluated in a manner similar to Example 1, except that, as a plasticizer, 5 parts of tri-2-ethylhexyl trimellitate (trade name "ADK Cizer C-8", manufactured by ADEKA CORPORATION) were added instead of polyetherester, and 5 parts of magnesium silicate (trade name "KYOWAAD 600S", manufactured by Kyowa Chemical Industry Co., Ltd., metallic compound having an amount of stearic acid adsorption of 63 mg/g and a nitrogen adsorption specific surface area of 150 m$^2$/g) were added instead of aluminum hydroxide. The results are given in Table 1.

From Table 1, it was found that the rubber crosslinked product obtained from a rubber composition compounded with a carboxyl group-containing nitrile rubber of which an iodine value was 120 or less, a polyetherester plasticizer, and a metallic compound of which an amount of stearic acid adsorption was 80 mg/g or more and 300 mg/g or less was superior in mechanical characteristics and water resistance while a high sealing performance was maintained (Examples 1 to 6).

In contrast, in the rubber composition including the carboxyl group-containing nitrile rubber, in a case where the polyetherester plasticizer was not compounded, or in a case where the metallic compound of which the amount of stearic acid adsorption was 80 mg/g or more and 300 mg/g or less was not compounded, the resulting rubber crosslinked product was inferior in mechanical characteristics and water resistance (Comparative Examples 1 to 3).

The embodiment of the present invention has been hereinabove described with reference to the embodiment, but the present invention is not limited to particular embodiments and examples, and can be modified and changed in various manners within the scope of the invention described in the claims.

This international application claims the priority based on Japanese Patent Application No. 2017-250161 filed on Dec. 26, 2017, the entire content of which is incorporated herein by reference.

The invention claimed is:
1. A rubber composition comprising:
 a carboxyl group-containing nitrile rubber of which iodine value is 120 or less;
 a polyetherester plasticizer; and
 a metallic compound,

TABLE 1

|  |  | Examples |  |  |  |  |  | Comparative Examples |  |  |
|---|---|---|---|---|---|---|---|---|---|---|
|  |  | 1 | 2 | 3 | 4 | 5 | 6 | 1 | 2 | 3 |
| Configuration of nitrile rubber composition | | | | | | | | | | |
| Carboxyl group-containing highly-saturated nitrile rubber (A) | (Parts) | 100 | 100 | 100 | 100 | 100 | 100 | 100 | 100 | 100 |
| FEF carbon black | (Parts) | 50 | 50 | 50 | 50 | 50 | 50 | 50 | 50 | 50 |
| Polyether ester | (Parts) | 5 | 5 | 5 | 5 | 5 | 5 | 5 | | |
| Tri-2-ethylhexyl trimellitate | (Parts) | | | | | | | | 5 | 5 |
| 4,4'-bis(α, α-dimethylbenzyl) | (Parts) | 1.5 | 1.5 | 1.5 | 1.5 | 1.5 | 1.5 | 1.5 | 1.5 | 1.5 |
| Stearic acid | (Parts) | 1 | 1 | 1 | 1 | 1 | 1 | 1 | 1 | 1 |
| Polyoxyethylene alkyl ether phosphate ester | (Parts) | 1 | 1 | 1 | 1 | 1 | 1 | 1 | 1 | 1 |
| Hexamethylenediamine carbamate | (Parts) | 1.9 | 1.9 | 1.9 | 1.9 | 1.9 | 1.9 | 1.9 | 1.9 | 1.9 |
| 1,8-diazabicyclo[5,4,0]undecene-7 (DBU) of 60% | (Parts) | 4 | 4 | 4 | 4 | 4 | 4 | 4 | 4 | 4 |
| Aluminum hydroxide (amount of stearic acid adsorption: 156 (mg/g)) | (Parts) | 3 | 5 | 10 | | | 5 | | | |
| Aluminum magnesium oxide (amount of stearic acid adsorption: 250 (mg/g)) | (Parts) | | | | 5 | | | | | |
| Synthetic hydrotalcite (amount of stearic acid adsorption: 236 (mg/g)) | (Parts) | | | | | 5 | | | | |
| Magnesium silicate (amount of stearic acid adsorption: 63 (mg/g)) | (Parts) | | | | | | | | | 5 |
| Processing aid HT750 | (Parts) | | | | | | 4 | | | |
| Evaluation of nitrile rubber composition Physical property | | | | | | | | | | |
| Elongation | (%) | 170 | 170 | 160 | 150 | 150 | 130 | 180 | 190 | 180 |
| Sealing performance | | | | | | | | | | |
| Compression set | (%) | 14 | 14 | 14 | 32 | 35 | 19 | 20 | 20 | 17 |
| Water resistance (80 degrees Celsius, 168 hours) | | | | | | | | | | |
| Volume change rate | (%) | 10 | 9 | 8 | 9 | 8 | 6 | 11 | 13 | 14 | wherein, when charged into a dioctyl phthalate solution of stearic acid at 105° C. for 60 mins, the metallic compound has a stearic acid adsorption of 100 mg/g or more and 200 mg/g or less.

2. The rubber composition according to claim 1, wherein a nitrogen adsorption specific surface area of the metallic compound is 30 m$^2$/g or more and 300 m$^2$/g or less.

3. A rubber crosslinked product obtained by crosslinking the rubber composition of claim 1.

4. The rubber crosslinked product according to claim 3, wherein a volume change rate obtained when the rubber crosslinked product is immersed in distilled water at 80 degrees Celsius for 168 hours is equal to or less than 10%.

* * * * *